(12) United States Patent
Han et al.

(10) Patent No.: US 12,426,590 B2
(45) Date of Patent: Sep. 30, 2025

(54) COVER BODY FOR WEED REMOVING TOOL

(71) Applicant: Zhejiang Prulde Electric Appliance Co., Ltd., Zhejiang (CN)

(72) Inventors: Ting Han, Zhejiang (CN); Wei-Ming Yang, Zhejiang (CN)

(73) Assignee: Zhejiang Prulde Electric Appliance Co., Ltd., Zhejiang (CN)

( * ) Notice: Subject to any disclaimer, the term of this patent is extended or adjusted under 35 U.S.C. 154(b) by 122 days.

(21) Appl. No.: 18/419,388

(22) Filed: Jan. 22, 2024

(65) Prior Publication Data

US 2024/0224981 A1 Jul. 11, 2024

Related U.S. Application Data

(62) Division of application No. 17/568,733, filed on Jan. 5, 2022, now abandoned, which is a division of application No. 15/222,952, filed on Jul. 29, 2016, now abandoned.

(30) Foreign Application Priority Data

| Apr. 8, 2016 | (CN) | 201620289531.1 |
| Apr. 27, 2016 | (CN) | 201620366627.3 |
| Apr. 27, 2016 | (CN) | 201620366908.9 |
| May 10, 2016 | (CN) | 201610307985.1 |
| May 10, 2016 | (CN) | 201620420734.X |

(51) Int. Cl.
*A01M 15/00* (2006.01)
*A01M 21/04* (2006.01)

(52) U.S. Cl.
CPC ............................ *A01M 21/04* (2013.01)

(58) Field of Classification Search
CPC ....... A01M 15/00; A01M 21/04; A01M 21/046
See application file for complete search history.

(56) References Cited

U.S. PATENT DOCUMENTS

| 2,290,942 | A | 7/1942 | Clary et al. |
| 3,902,273 | A | 9/1975 | Friedman |
| 4,637,161 | A | 1/1987 | Turner |
| 5,870,852 | A | 2/1999 | Stanley |
| 5,927,601 | A | 7/1999 | Newson et al. |
| 6,047,900 | A | 4/2000 | Newson et al. |
| 6,073,859 | A | 6/2000 | Görgens |
| 6,505,437 | B1 * | 1/2003 | Johnstone ............ A01M 21/04 47/1.7 |
| D585,249 | S | 1/2009 | Ballu |
| 7,507,086 | B2 | 3/2009 | Jaulent |

(Continued)

FOREIGN PATENT DOCUMENTS

| CH | 663132 | 11/1987 |
| CN | 201392014 | 1/2010 |

(Continued)

*Primary Examiner* — Monica L Perry
(74) *Attorney, Agent, or Firm* — JCIPRNET

(57) ABSTRACT

A cover body for weed removing tool includes a heat dissipation port for heat dissipation. A cover sheet for regulating a size of the heat dissipation port is arranged at a position on the cover body corresponding to the heat dissipation port, and the cover sheet is connected to the cover body, and is subject to displacement relative to the cover body.

5 Claims, 10 Drawing Sheets

(56) References Cited

U.S. PATENT DOCUMENTS

| | | | |
|---|---|---|---|
| 7,946,511 B2 * | 5/2011 | Ballu | A01M 7/0046 |
| | | | 141/49 |
| 7,954,276 B1 | 6/2011 | Jackson | |
| 8,438,778 B2 * | 5/2013 | Rose | A01M 21/043 |
| | | | 401/262 |
| 8,998,524 B2 * | 4/2015 | Shoaf | A01M 21/043 |
| | | | 401/206 |
| 9,426,974 B2 | 8/2016 | Hobbs et al. | |
| 9,648,864 B1 | 5/2017 | Kent et al. | |
| 10,028,499 B2 | 7/2018 | Ballu | |
| 11,882,821 B1 * | 1/2024 | Norton | A01M 17/002 |
| 2003/0136048 A1 | 7/2003 | Newson | |
| 2011/0253803 A1 | 10/2011 | Kennedy | |
| 2017/0290325 A1 * | 10/2017 | Han | A01M 21/04 |

FOREIGN PATENT DOCUMENTS

| | | |
|---|---|---|
| CN | 202169450 | 3/2012 |
| CN | 102845410 | 1/2013 |
| CN | 104146479 | 11/2014 |
| CN | 205106135 | 3/2016 |
| CN | 205695246 | 11/2016 |
| DE | 3804052 | 8/1989 |
| DE | 9113363 | 2/1992 |
| DE | 4039359 | 6/1992 |
| DE | 9112971 | 6/1992 |
| EM | 000671375-0001 | 4/2007 |
| EP | 2540162 | 7/2013 |
| ES | 2404079 | 5/2013 |
| KR | 20100086409 | 7/2010 |
| WO | 9925186 | 5/1999 |

\* cited by examiner

COVER BODY FOR WEED REMOVING TOOL

CROSS-REFERENCE TO RELATED APPLICATIONS

This application is a divisional application of and claims the priority benefit of U.S. application Ser. No. 17/568,733, filed on Jan. 5, 2022. The prior application Ser. No. 17/568,733 is a divisional application of and claims the priority benefit of a prior application Ser. No. 15/222,952, filed on Jul. 29, 2016, which claims the priority benefit of China application Ser. No. 201620289531.1, filed on Apr. 8, 2016 and China application serial no. 201620366627.3, filed on Apr. 27, 2016 and China application Ser. No. 201620366908.9, filed on Apr. 27, 2016 and China application Ser. No. 201610307985.1, filed on May 10, 2016 and China application Ser. No. 201620420734.X, filed on May 10, 2016. The entirety of each of the above-mentioned patent applications is hereby incorporated by reference herein and made a part of this specification.

TECHNICAL FIELD

The present invention relates to the field of electric tools, and in particular, relates to a weed removing tool.

BACKGROUND

The categories of weed removing tools are more and more refined. In the current market, a weed burner in a substantially elongated shape emerges. A common weed remover is only capable of removing stem and leaves of the weed, with the root of the weed still remaining in the soil. In this way, a period of time later, new stem and leaves may grow out from the root. However, the weed burner may spray hot wind which can kill the root of the weed, which prevents the growth of new stem or leaves from the root. Since this type of product is just released to the market, few development resources are provided to the product, such that the product is subjected to various problems during use.

In the related art, to solve this technical problem, the invention patent No. 201210228409.X entitled with "DEVICE, ASSEMBLY, AND METHOD FOR MANUALLY LOCALLY REMOVING WEED" is provided. A heat generator 4 attached to a rod 2 is disclosed. The heat generator 4 includes a fan and a heating resistor, the heat generator 4 injects a hot air jet flow J1 to an interior volume V5 of a clock-shaped member 5, wherein the clock-shaped member 5 is provided with a free end 51 operable to bear and support the device 1 on the ground. According to this invention patent, the clock-shaped member 5 is provided with at least one hole operable to exhaust an air jet flow J2 from the interior volume V5 of the clock-shaped member 5. A spacing between the hole and the free edge 51 is greater than 2 cm.

In the related art, the blower and the hot weed remover, although with different names, operate under the similar principle. However, the hole designed in the related art reduces the efficiency of the heating device to some extent. Particularly, the heating device fails to conduct heating based on precise positioning. In addition, turbulence may be caused during adjustment the air speed at the air outlet, thereby causing user inconvenience.

SUMMARY

To solve the above problem, the present invention provides a weed removing tool which may be more conveniently used, to attain improvements in three aspects of weed removing efficiency, product use safety and product life time.

To achieve the above objective, in the present invention, a weed removing tool includes a tool body and a cover body arranged on an air outlet on the tool body. The cover body is provided with a support frame forming a heat dissipation gap between an opening and an object to be processed during operation. Such a structure firstly prevents the problem that the entire heating object is over-heated and burned because the cover body is coated over the heating object and is not timely removed. In addition, with such a structure, during heating, the force applied by the hands may be reduced by means of the support frame, the working load may be lowered, and the entire heating precision is higher.

Preferably, the support frame includes a fixing portion connected to the cover body, and a support end acting on the object to be processed and forming the heat dissipation gap.

The present invention further provides a weed removing tool including a tool body and a cover body arranged on an air outlet, the cover body having a heat dissipation port. A cover sheet for regulating the size of the heat dissipation port to thus regulate the temperature at the air outlet is arranged at a position on the cover body corresponding to the heat dissipation port. With such a structure, during heating, the size of the heat dissipation port may be adjusted according to the actual needs, which does not waste the heat within the cover body, and additionally prevents safety risks caused by over-heating within the cover body. The entire structure may be more conveniently carried and mounted.

Preferably, the cover sheet is connected to the cover body, and is movable relative to the cover body. Through movement, the cover sheet may adjust the area covering the heat dissipation port, thereby controlling the heat dissipated from the heat dissipation port and achieving the effect of temperature adjustment.

Preferably, the cover sheet is an outer cover coating the cover body, the outer cover axially moving relative to the cover body and being fixed to a selected position. In this way, the size of the heat dissipation port may be adjusted by axially moving the cover sheet.

Preferably, the cover sheet is an outer cover coating an outer side of the cover body, the outer cover being provided with a limiting port 88 matching with the heat dissipation port, and the outer cover rotating relative to the cover body. The overlap portion between the limiting port 88 and the heat dissipation port is an actually opened portion of the heat dissipation port. With such a solution, the actually opened area of the dissipation port may be adjusted by rotating the outer cover, thereby adjusting the actual temperature within the cover body.

Preferably, the air outlet of the tool body is further provided with a root burning probe. With such a structure, the tool may be directly inserted into the soil to cut the root of the weed, thereby really achieving the effect of absolutely eliminating the weed. In this way, the weed may be effectively, environmentally and quickly removed. In addition, during the weed removing, the soil may also be loosened, and the pests underneath the soil may also be killed, thereby improving the quality of the soil.

Preferably, the root burning probe is a hollow conical structure, and a top portion of the probe is provided with an air outlet hole. Such a structure ensures that the burning and removing work is conducted in a short range after the tool is inserted into the soil.

Preferably, heat dissipation holes are arranged on a side wall of the root burning probe. The heat dissipation port provided on the side wall of the root burning probe prevents overheat of the intermediate portion of the root burning probe. During use, the heat dissipation port on the side wall of the root burning probe outside the soil prevents the root burning probe from being burnt due to over-heat.

Preferably, an edge of the air outlet hole at the top portion the root burning probe is a blade portion. In this way, the weed may be firstly cut and then burnt, thereby achieving a very thorough removing effect.

Preferably, the root burning probe is a solid metal cone. In some scenarios where the soil is very solid and hard, the hollow root burning probe is hard to be inserted, and thus the probe is subjected to great wear. In this case, a solid metal cone may be conveniently inserted into the root of the weed. However, such a structure requires that the probe is inserted to be very close to the root of the weed, in order to achieve an anticipated burning and removing effect.

Preferably, the weed removing tool further includes at least one wheel body arranged on a side face of the cover body and operable to support the weed removing tool. When the weed removing region needs to be shifted, a user may directly conveniently move the tool to a next location by means of pushing. This prevents the spray cover from being affected by the objects on the ground. During normal use, the weed removing tool has its own weight and may be subjected to jitter. However, in this solution, the wheels of the tool withstands from the pressure and jitter, thereby prolonging the life time of the spray cover, and enhancing the overall stability of the entire tool.

Preferably, the weed removing tool further includes a free edge, wherein a plane where the freed edge of the cover body is located forms an inclined angle with a plane perpendicular to an air outlet direction of the air outlet. The free edge refers to an edge of an air outlet side of the opening on the cover body. With such an angle, the tool may not be necessarily perpendicular to the ground when a hot wind gun is used. This facilitates the use and operations of the tool.

Preferably, the tool body and the cover body are integrally formed.

With the technical solution of the present invention, the tool is designed with respect to different weed burning and removing scenarios very dedicatedly, and the weed burning and removing work may be more professionally, more safely and more effectively conducted.

These advantages and characteristics of the present invention are described hereinafter in detail in the detailed description, and accompanying drawings.

BRIEF DESCRIPTION OF THE DRAWING

The present invention is further described with reference to the accompanying drawings.

DETAILED DESCRIPTION

The technical solution according to embodiments of the present invention is further illustrated and described with reference to the accompanying drawings of the embodiments of the present invention. However, the embodiments hereinafter are merely some preferred embodiments, rather than all embodiments of the present invention. Based on the embodiments of the present invention, all other embodiments derived by persons of ordinary skill in the art without any creative efforts shall fall within the protection scope of the present invention.

Figure 1:
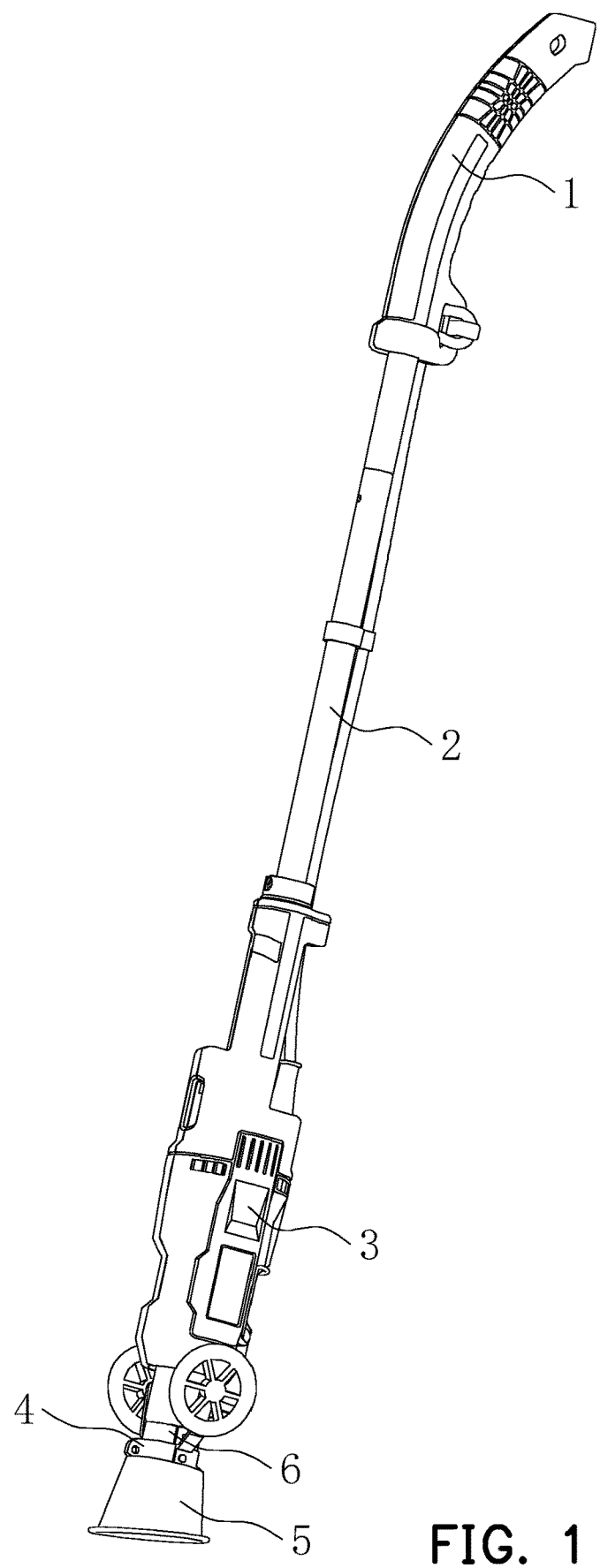
FIG. 1 is a schematic integral view of a weed removing tool equipped with a wheel body according to the present invention.

As illustrated in FIG. 1, a weed removing tool is provided, which includes a tool body, wherein the tool body is a tool body rod 2 having a handle 1 and a cover body 5 connected to the tool body rod 2. The other end of the tool body rod 2 is provided with a heating and air blowing apparatus 3. A front end of the heating and air blowing apparatus 3 is provided with an air outlet 6.

Embodiment 1

Figure 2:
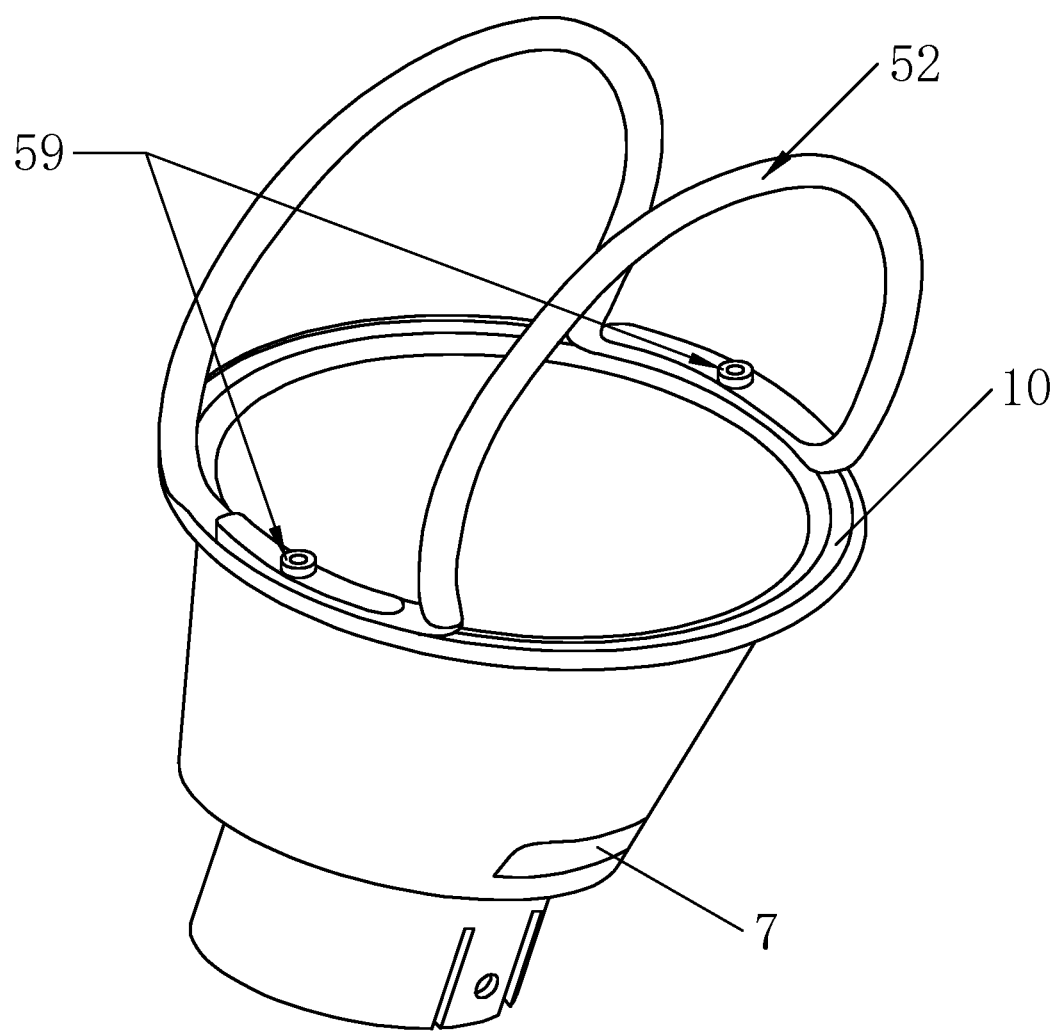
FIG. 2 is a schematic structural diagram of a cover body of a weed removing tool according to Embodiment 1 of the present invention.

As illustrated in FIG. 2, a weed removing tool is provided, wherein at least two parallelly arranged arc-shaped metal support rings 52 are fixed on a free edge 10 of the cover body 5 by using a fixing member, wherein the metal support rings 52 do not obscure the air outlet 6 of the tool body. Such a structure ensures that the free edge 10 of the cover body 5 is maintained a specific distance from the object to be processed, wherein this distance is generally preferably defined between 1 cm and 3 cm. During heating, the radian of the metal support rings 52 may also be utilized to precisely adjust the heating angle only with a mild force.

Embodiment 2

Figure 3:
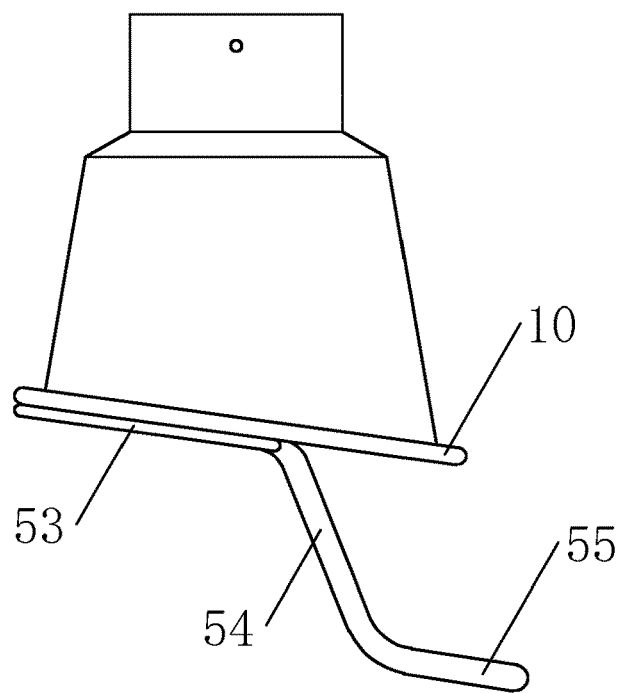
FIG. 3 is a schematic structural diagram of a cover body of a weed removing tool according to Embodiment 2 of the present invention.
Figure 4:
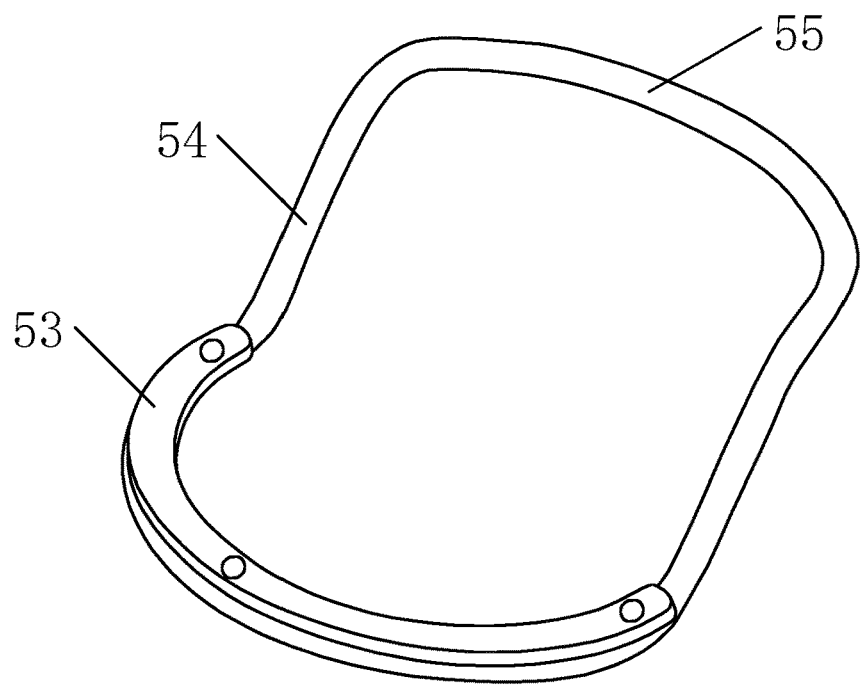
FIG. 4 is a schematic structural diagram of a cover body of a weed removing tool according to Embodiment 2 of the present invention.

As illustrated in FIG. 3 and FIG. 4, a weed removing tool is provided, wherein the support frame includes a fixing portion 53, a transitional portion 54 and a support portion 55. The fixing portion 53 has the same radian as the free edge 10 of the cover body 5, and is fixed on the free edge 10. The support portion 55 is distal from the free edge 10. The transitional portion 54 is connected to the fixing portion 53 and the support portion 55, and ensures that the support portion 55 is still capable of maintaining a distance of at least 1 to 3 cm from the free edge 10 when withstanding a force. With such a structure, the support frame is securely fixed to the cover body 5, and thus the structure is capable of withstand a greater force.

Embodiment 3

Figure 5:
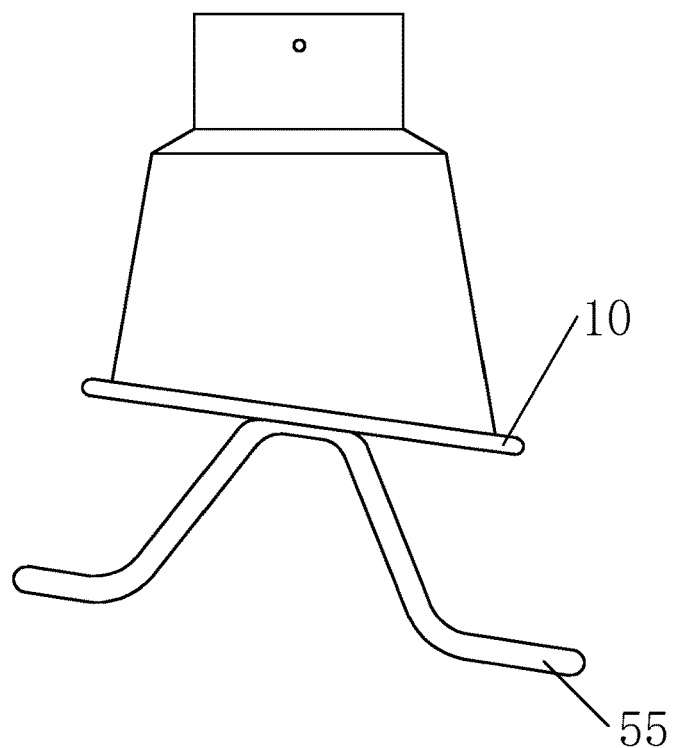
FIG. 5 is a schematic structural diagram of a cover body of a weed removing tool according to Embodiment 3 of the present invention.
Figure 6:
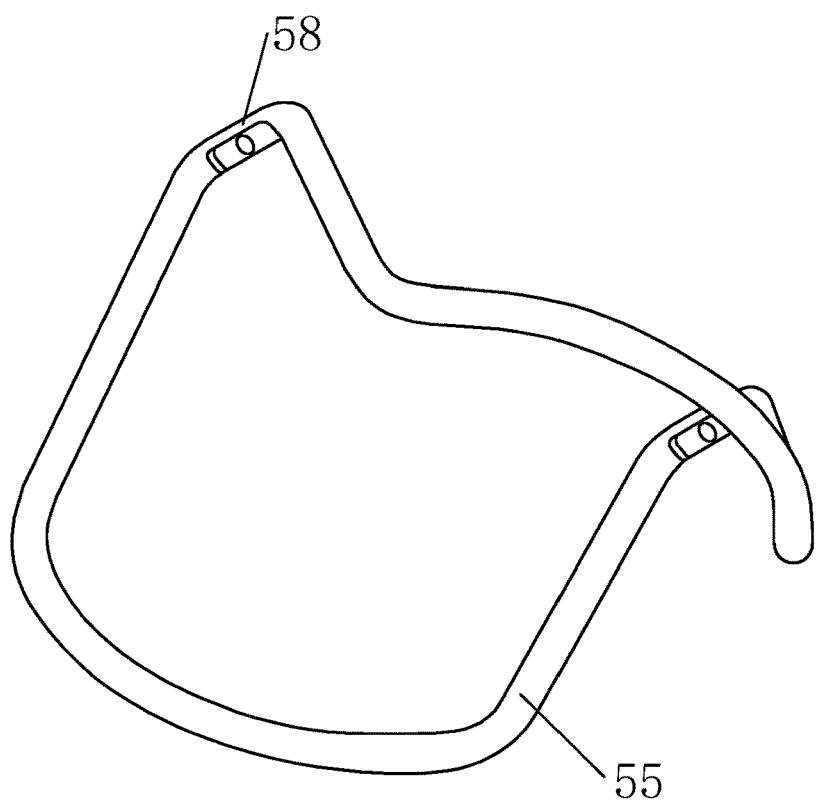
FIG. 6 is a schematic structural diagram of a cover body of a weed removing tool according to Embodiment 3 of the present invention.

As illustrated in FIG. 5 and FIG. 6, a weed removing tool is provided, wherein the side view of the support frame is an inverted V shape, wherein a highest point 58 of the inverted V shape is fixed to the free edge 10, and the bottom of the inverted V shape is an annular support portion 55. Such a structure is advantageously in that the structure is stable and thus labor saving for the operational personnel.

In various embodiments, the free edge 10 of the cover body 5 is a flat edge, and is designed such that an inclined angle of not greater than 30 is formed between the plane where the cover body is located and the plane perpendicular to an air outlet direction of the air outlet 6. In this way, even if the support frame is burnt, the cover body 5 would not form an closed region with the heating object to cause over-heat.

If it is further desired to reduce the heat, a heat dissipation port 7 is further provided on the cover body 5.

In various embodiments, the support frame and the cover body 5 may be fixed to each other via a rivet 59 or by means of direct welding. In several embodiments of the present invention, since the support frame is mounted on the free edge 10 and the contact area thereof is small, a rivet-based connection is employed.

Although in the specific embodiments, implementation of mounting the support frame on an inner side or an outer side of the cover body 5 is not involved, it may be readily inferred from the embodiments that the support frame is mounted on the inner side or the outer side of the cover body 5. These technical solutions are all within the protection scope of the present invention. In addition, in such embodiments, the support frame is more suitable to be mounted on the cover body 5 by means of welding.

Embodiment 4

Figure 7:
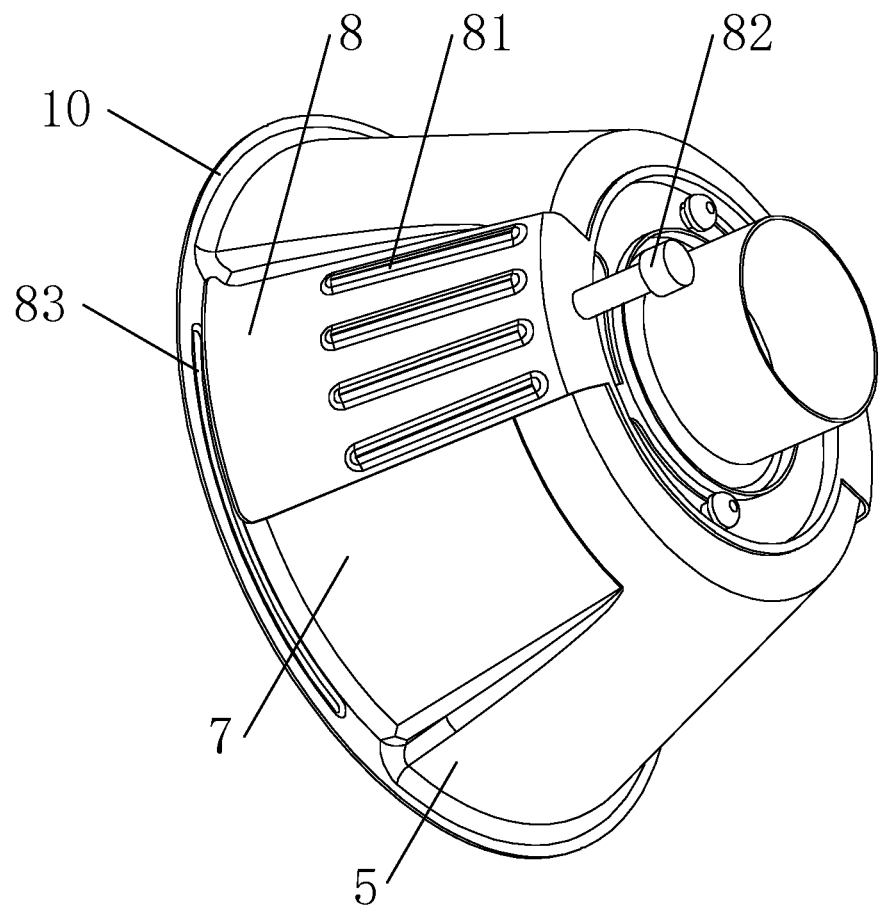
FIG. 7 is a schematic structural diagram of a cover body of a weed removing tool according to Embodiment 4 of the present invention.

As illustrated in FIG. 7, a weed removing tool according to the present invention includes a cover body 5 having a heat dissipation port 7 for heat dissipation, wherein a cover sheet 8 for regulating the size of the heat dissipation port to thus regulate the temperature at an air outlet 6 is arranged at a position on the cover body 5 corresponding to the heat dissipation port 7. The cover sheet 5 is connected to the cover body 5, and is subject to displacement relative to the cover body 5. The displacement includes rotation and translation of the cover sheet 8.

The cover sheet 8 is a trapezoid cover sheet 8 and the coverage area thereof is greater than the area of the heat dissipation port 7. The cover body 5 includes the free edge 10. The free edge 10 refers to an edge at the position of the air outlet port 6 of the cover body 5, which is in direct contact with the circle of the heating object. The free edge neighboring the heat dissipation port 7 is provided with a limiting groove 83 restricting a movement range of the cover sheet 8. A push rod 82 for controlling movement of the cover sheet 8 is further provided on an upper end of the cover sheet 8. In this way, the position of the cover sheet 8 may be adjusted by moving the push rod 82. To prevent the cover sheet 8 from being subjected to displacement after the adjustment, the cover sheet 8 is provided with at least one hollow protrusion strip 81. The hollow protrusion strip 81 meanwhile prevents the cover sheet 8 from deformation due to thermal expansion and contraction. Four to six hollow protrusion strips 81 are generally parallelly arranged, such that a better utilization effect is achieved.

In this way, the weed removing tool according to the present invention may be used after being mounted in a weed burner. During use, the heat within the cover body 5 may be controlled by adjusting the position of the cover sheet 8.

Embodiment 5

Figure 8:
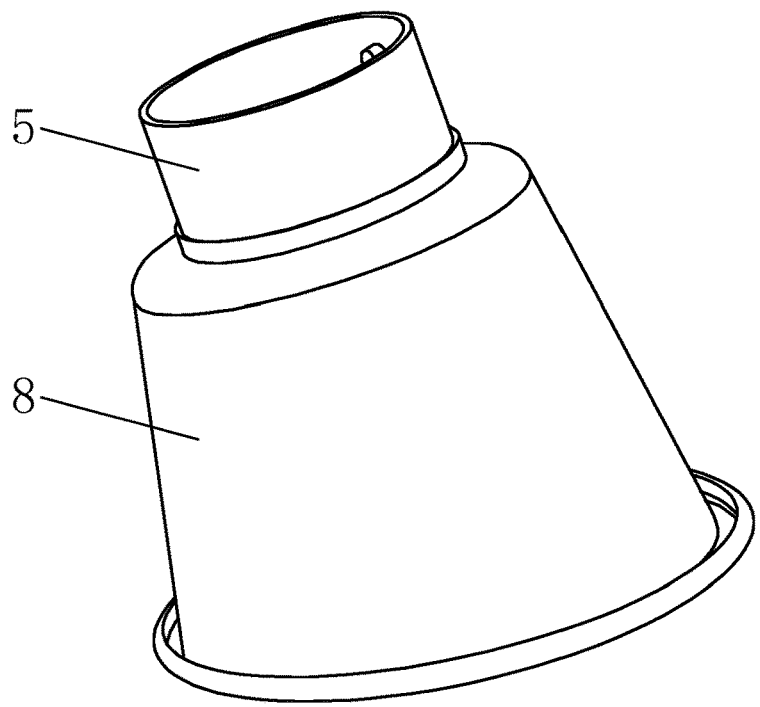
FIG. 8 is a schematic structural diagram of a cover body of a weed removing tool according to Embodiment 5 of the present invention.
Figure 9:
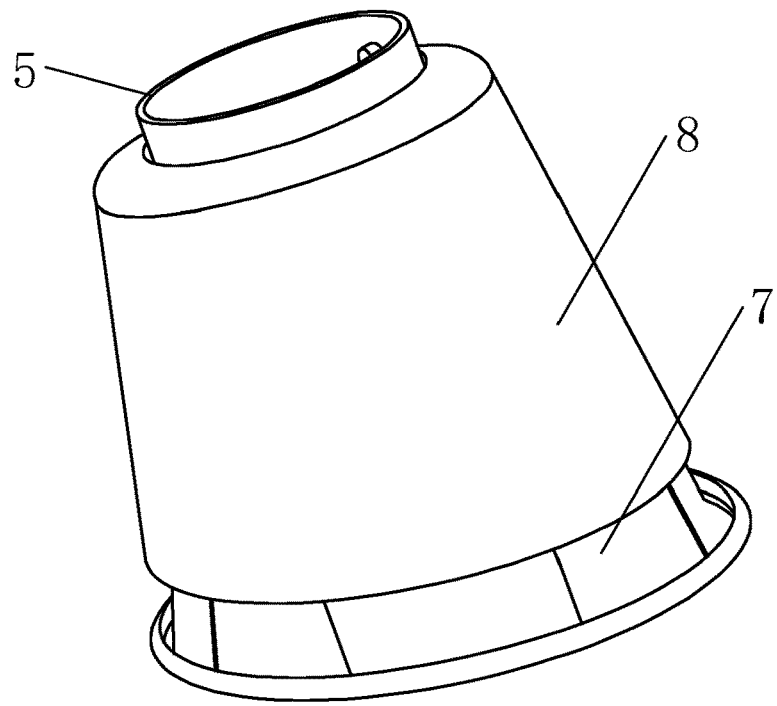
FIG. 9 is a schematic structural view of a cover body according to Embodiment 5 of the present invention.

As illustrated in FIGS. 8 and 9, a weed removing tool according to the present invention includes a cover body 5 which is provided with a heat dissipation port 7 for heat dissipation, wherein a cover sheet 8 for regulating the size of the heat dissipation port 7 to thus regulate the temperature at an air outlet 6 is arranged at a position on the cover body 5 corresponding to the heat dissipation port 7. The cover sheet 8 is an outer cover coating the cover body 5. The outer cover axially moves relative to the cover body 5, and may be fixed to a selected position. A top portion of the outer cover is connected to the body of the weed burner, and is provided with a rapid fastener.

In this embodiment, the size of the heat dissipation port 7 is controlled by axially adjusting the position of the outer cover. After the adjustment, the heat dissipation port is fixed to the position by using a fast fastener.

Embodiment 6

Figure 10:
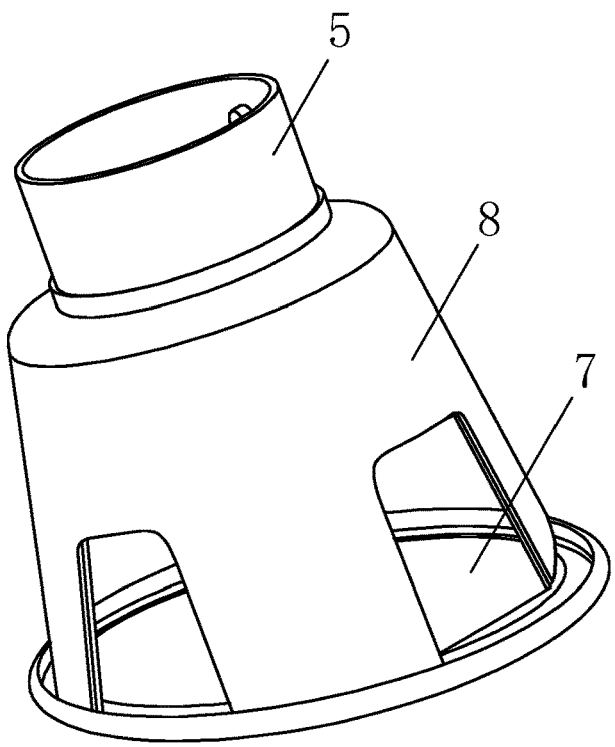
FIG. 10 is another schematic structural view of the cover body according to Embodiment 5 of the present invention.
Figure 11:
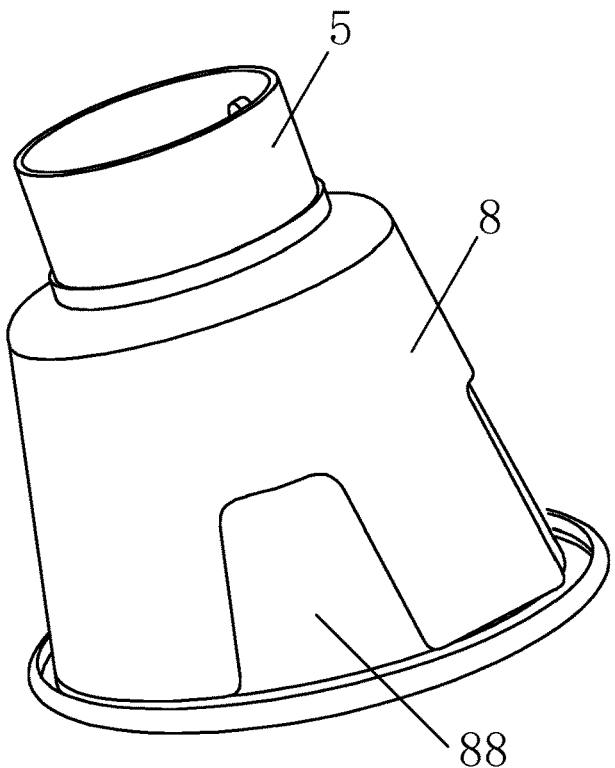
FIG. 11 is a schematic structural diagram of a cover body of a weed removing tool according to Embodiment 6 of the present invention.

As illustrated in FIG. 10 and FIG. 11, a weed removing tool according to the present invention includes a cover body 7 which is provided with a heat dissipation port 7 for heat dissipation, wherein a cover sheet 8 for regulating the size of the heat dissipation port 7 to thus regulate the temperature at an air outlet 6 is arranged at a position on the cover body 5 corresponding to the heat dissipation port 7. The cover sheet 8 is an outer cover coating the outer side of the cover body 5. The outer cover is provided with a limiting port 88 matching with the heat dissipation port 7, and rotates relative to the cover body 5. In this way, the overlap portion between the rotated limiting port 88 and the heat dissipation port 7 is the really opened heat dissipation port. In this way, the actual temperature within the cover body 5 is adjusted.

Embodiment 7

Figure 12:
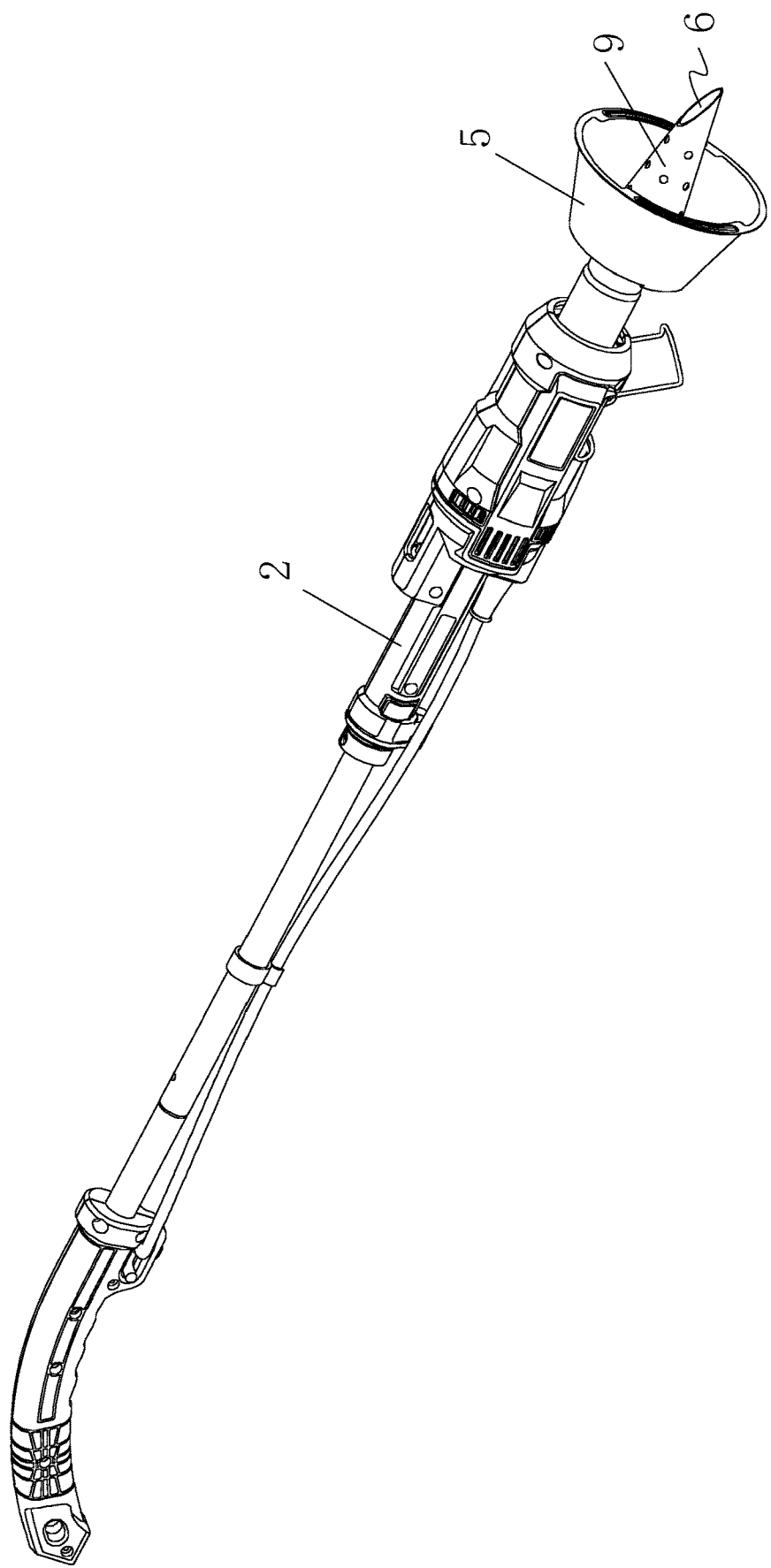
FIG. 12 is a schematic structural diagram of a weed removing tool equipped with a root burning probe according to Embodiment 7 of the present invention.
Figure 13:
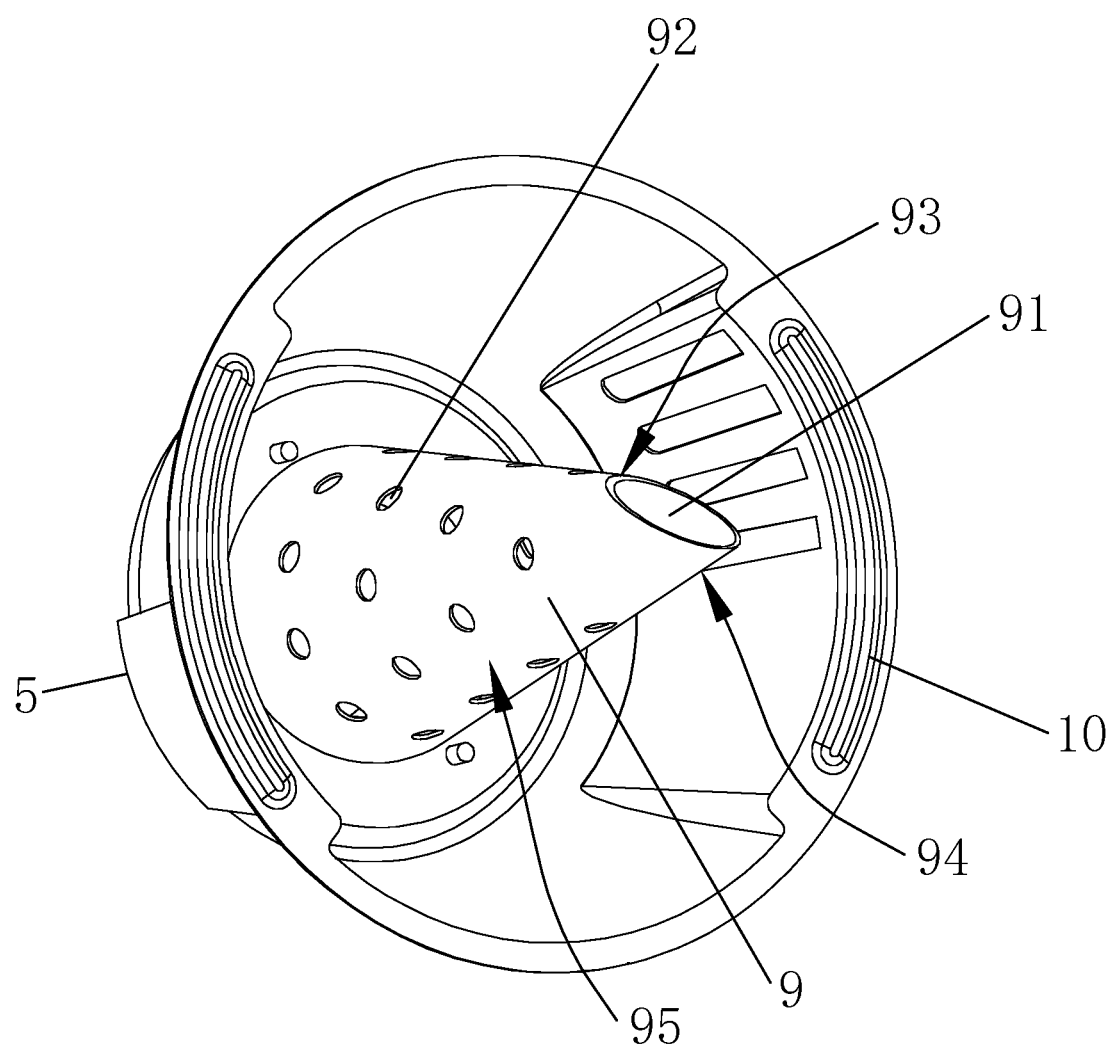
FIG. 13 is a schematic structural diagram of a cover body equipped with a root burning probe according to Embodiment 7 of the present invention.

As illustrated in FIG. 12 and FIG. 13, a weed removing tool according to the present invention, a root burning probe 9 is fixed to the position of an air outlet 6, wherein the root burning probe 9 is a hollow conical structure. A top portion 94 of the root burning probe 9 is provided with an air outlet hole 91, and a side wall 95 of the root burning probe 9 is provided with heat dissipation holes 92. The air outlet hole 91 is arranged on a side face of the root burning probe 9, and the air outlet hole 91 is tangential to the top portion of the root burning probe 9. The edge of the air outlet hole 91 is a blade portion 93. In this way, before the root burning probe 9 is inserted into the soil, the weed removing tool may firstly cut the weed and then burning and remove the root of the weed by means of heating.

The cover body 5 includes a body having a heat dissipation groove, wherein a sliding barrier is mounted on the body. The cover body 5 is further provided with a limiting sliding groove, and the sliding barrier is mounted in the limiting sliding groove. A side face of the sliding barrier is further provided with parallel ribs, and the sliding barrier is further connected to an operation rod.

With respect to different cases, the root burning probe 9 and the tool body may be integrally formed, and the cover body 5 is mounted on the tool body via a detachable connection member. Similarly, the root burning probe 9 may also be formed integrally with the cover body 9, and then mounted on the tool body.

Embodiment 8

In a weed removing tool according to the present invention, a root burning probe 9 is fixed at the position of an air outlet port 6, wherein the root burning probe 9 is a solid metal cone. Such a structure is suitable for the scenario of solid and hard soil. The cover body 5 includes a body having a heat dissipation groove, wherein a sliding barrier is mounted on the body. The cover body 5 is further provided with a limiting sliding groove, and the sliding barrier is mounted in the limiting sliding groove. A side face of the sliding barrier is further provided with parallel ribs, and the sliding barrier is further connected to an operation rod.

With respect to different cases, the root burning probe 9 and the tool body may be integrally formed, and the cover body 5 is mounted on the tool body via a detachable connection member. Similarly, the root burning probe 9 may also be formed integrally with the cover body 9, and then mounted on the tool body.

In the above described various embodiments, a wheel body 4 may be provided, that is, two wheels 44 are fixed to two sides of the spray cover, wherein the two wheels 44 are operable to support the weed removing tool during the use.

Figure 14:
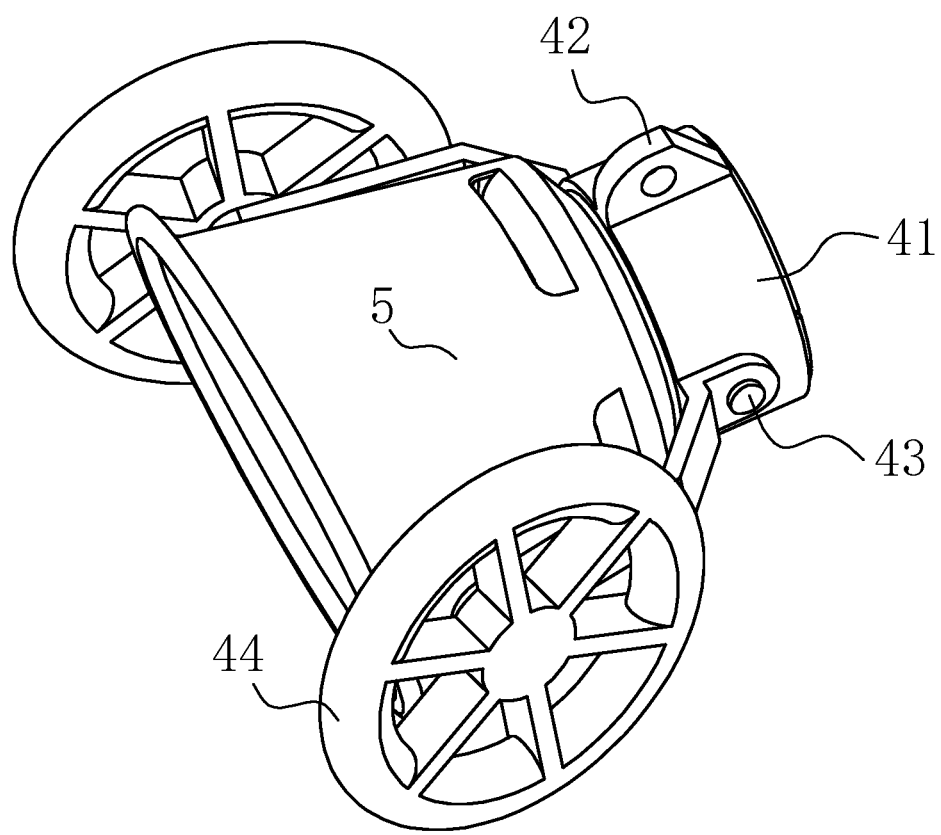
FIG. 14 is a schematic structural view of a cover body equipped with a wheel body according to the present invention.

Referring to FIG. 1 and FIG. 14, the two wheels 44 are fixed to a positioning ring 41 via a first support post and a second support post. With such a positioning manner, the wheels 44 do not need to be directly arranged on the cover body 5, thereby destroying the overall stability of the cover body 5 and prolonging the life time of the cover body 5.

One end of the cover body 5 is a hollow fastener post and the other end thereof is a hollow horn body, wherein the horn body and the fastener post are integrally formed. The positioning ring 41 is internally provided with an accommodation hole, and the fastener post passes through the accommodation hole and is fastened to the air outlet port 6. The cover body 5 is directly connected to the air outlet port 6, thereby preventing air leakage.

The positioning ring 41 is fixed on the fastener post 51 in the following fixing manner: the positioning ring is provided with at least one gap, the two ends of the positioning ring proximal to the gap extend outwardly to define a first extended sheet and a second extended sheet, wherein the first extended sheet is provided with a first screw hole and the second extended sheet is provided with a second screw hole mating with the first screw hole; a screw 43 passes though the first screw hole and the second screw hole to form a fastener member 42, wherein the fastener member 42 fixes the positioning ring 41 to the cylinder of the cover body. In this way, the entire structure has a good fixing effect and a low manufacture cost.

Described above are some specific embodiments of the present invention, and the protection scope of the present invention is not limited to such embodiments. A person skilled in the art would understand that the present invention includes, but not limited to, the accompanying drawings and the content of the above specific embodiments. Any modification made without departing from the functions and structural principles of the present invention shall all fall within the protection scope defined by the appended claims.

What is claimed is:

1. A cover body configured to mount to an air outlet of a weed burning tool, said cover body comprising a heat dissipation port on the cover body for heat dissipation, wherein a cover sheet for regulating a size of the heat dissipation port is arranged at a position on the cover body corresponding to the heat dissipation port, the cover sheet is connected to the cover body, and is subject to selective displacement relative to the cover body.

2. The cover body according to claim 1, wherein the cover sheet is a trapezoid cover sheet, and a coverage area of the cover sheet is greater than an area of the heat dissipation port.

3. The cover body according to claim 1, wherein the cover body includes a free edge, the free edge neighboring the heat dissipation port is provided with a limiting groove restricting a movement range of the cover sheet.

4. The cover body according to claim 1, wherein a push rod for controlling movement of the cover sheet is provided on an upper end of the cover sheet.

5. The cover body according to claim 1, wherein the cover sheet is provided with at least one hollow protrusion strip.

* * * * *